UNITED STATES PATENT OFFICE.

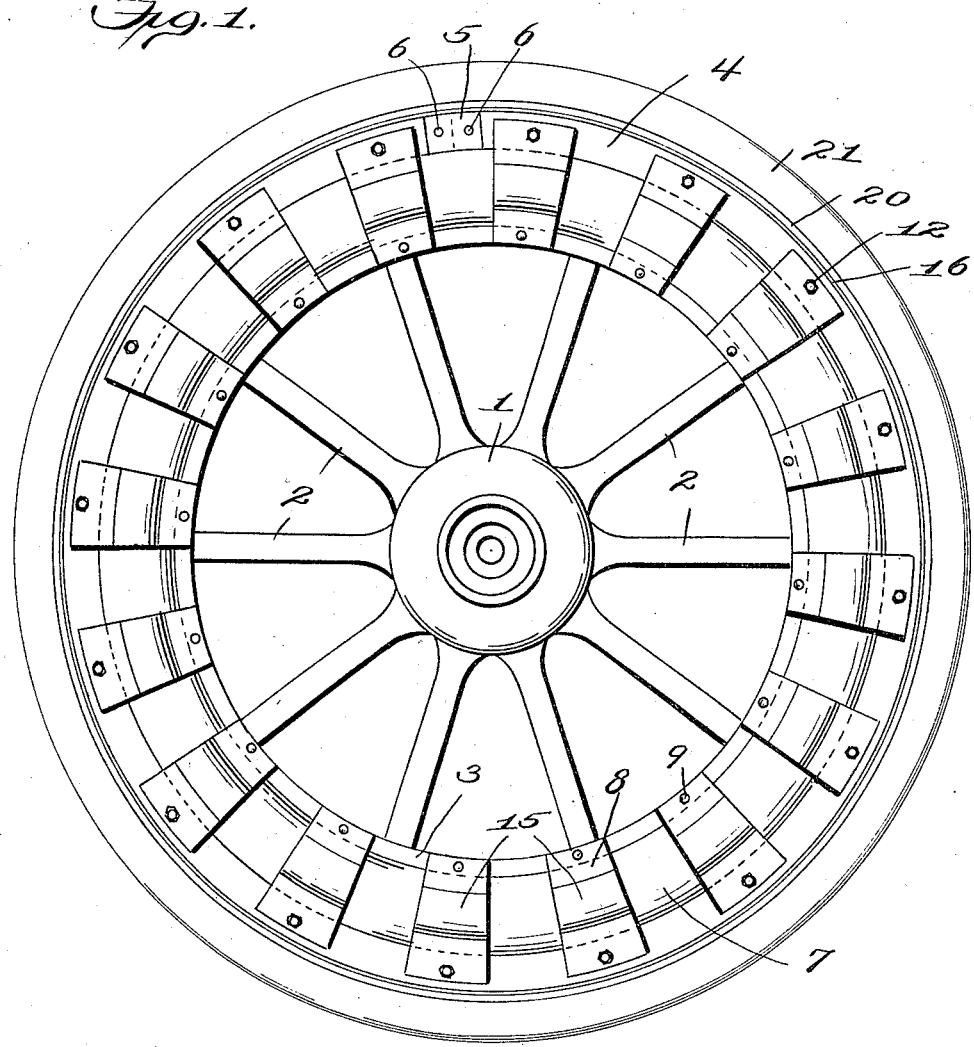

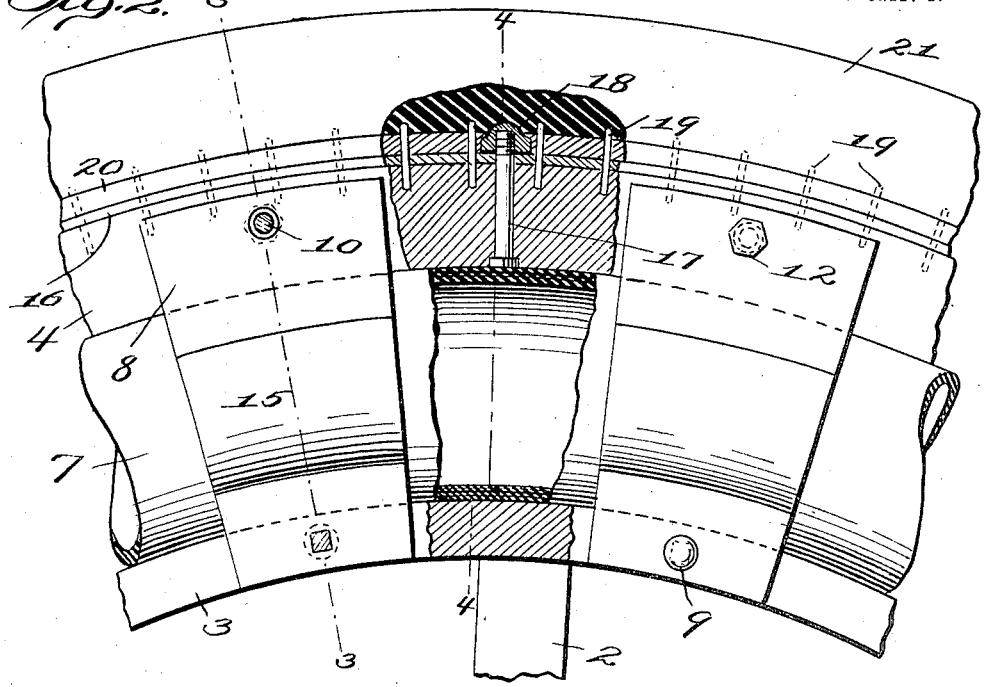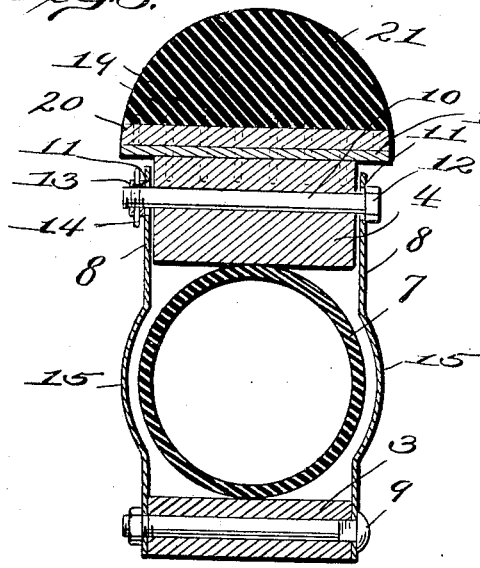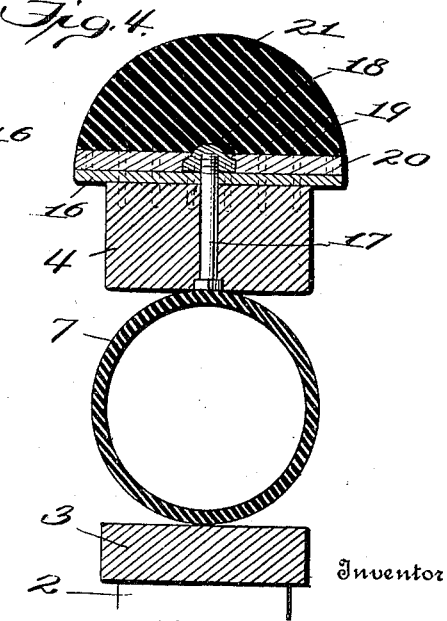

DANIEL MORIARTY, OF OAKLAND, CALIFORNIA.

VEHICLE-WHEEL.

1,312,415.   Specification of Letters Patent.   Patented Aug. 5, 1919.

Application filed October 31, 1917. Serial No. 199,517.

*To all whom it may concern:*

Be it known that I, DANIEL MORIARTY, a citizen of the United States, residing at Oakland, in the county of Alameda and State of California, have invented new and useful Improvements in Vehicle-Wheels, of which the following is a specification.

My present invention relates to improvements in vehicle wheels, and more especially to those of the type adapted for use upon automobiles, motor trucks and the like having resilient means interposed between its inner portion and its outer or tire-carrying felly whereby solid tires may be used efficiently and the requisite amount of resilience will be secured from within the wheel.

The objects of the invention are to provide a generally improved structure for resilient wheels of such type and to provide an improved mode of mounting and securing the tire upon the outer rim or felly whereby loosening and breakage of the tire are effectually prevented.

To these and other ends, the invention consists in certain improvements, and combinations and arrangements of parts, all as will be hereinafter more fully described, the novel features being pointed out particularly in the claims at the end of the specification In the accompanying drawings:

Figure 1 is a side elevation of a resilient vehicle wheel constructed in accordance with the present invention.

Fig. 2 is a side elevation, partly in section, of a section of the wheel; and

Figs. 3 and 4 represent sections on the lines 3—3 and 4—4 respectively of Fig. 2.

Similar parts are designated by the same reference characters in the several views.

The present improvements are applicable generally to vehicle wheels although they are particularly applicable to wheels such as used upon automobiles and motor trucks. The preferred embodiment of the invention is shown in the accompanying drawings and will be hereinafter described in detail, but it is to be understood that equivalent constructions are contemplated and will be included within the scope of the claims.

In the present instance the invention is applied to a wheel which comprises a hub 1 which may be of the usual construction and to which the spokes 2 are secured rigidly, the outer ends of the spokes being fixed in an inner continuous felly 3 which may be of wood, as usual, or of other suitable construction. According to the present invention, an outer felly 4 is provided which is composed of wood or other suitable material and is annular or endless in form, its ends being joined and secured firmly together by plates 5 which lap the joint and bolts 6 which extend through the plates and bind them firmly to the respective ends of the outer felly. The outer felly is of a diameter greater than that of the inner felly, thus providing an annular space between the fellies, and this space is provided for the purpose of accommodating a cushion which affords the requisite resilience between the hub or inner section of the wheel and the outer felly which carries the tire. Preferably, and as shown, the cushion is in the form of an inflated tube 7 which may be composed of an endless tube of canvas having rubber coated upon its inner and outer surfaces to render it air-tight, this tube when inflated withstanding the pressure of air within it although it is compressible, it resembling an ordinary single tube tire such as heretofore used. This cushion occupies the annular space between the inner and outer fellies and it is capable of sustaining the normal load upon the wheel which acts to move the inner felly at the lower side of the wheel downwardly. The cushion will also yield, more or less, to absorb abnormal pressure exerted by the inner felly thereon due to irregularities in the surface over which the wheel rolls or travels.

The outer felly is retained in coöperative relation with the inner felly by segmental plates 8 which are secured to the inner and outer fellies and are suitably spaced circumferentially thereof. Preferably, and as shown, these plates at the opposite sides of the wheel are arranged in pairs, they being clamped securely at their inner ends to the opposite sides of the inner felly 3 by a bolt 9 which extends through the plates and through the felly, and the outer ends of the plates of each pair are arranged at the opposite sides of the outer felly 4 and they are prevented from spreading by a bolt 10 which fits tightly into the outer felly and extends loosely through apertures 11 in the plates, the bolt having a head 12 at one end to lie against the outer side of one of the plates and a nut 13 adjustably applied to its opposite end and lying against the other plate, a cotter pin 14 being preferably fitted through the nut and through the bolt to prevent loosening of the nut after it has been adjusted. With this arrangement the plates are fixed rigidly to the inner felly but relative movement may occur between the plates and the outer felly 4. Preferably, the intermediate portions 15 of the plates are bowed or bulged in order to permit lateral spreading of the cushion when the latter is compressed in a radial direction.

The present invention also provides improved means for mounting and securing a solid rubber tire upon the outer felly. As shown, an endless metal band 16 is fitted tightly upon the outer periphery of the outer felly 4, it being preferably secured thereto by a suitable number of radial bolts 17 which extend outwardly through the inner felly and through the metal band, and a cap nut 18 is applied to the outer end of each of these anchor bolts. A number of pins 19, preferably of metal, are driven through holes in the metal band 16 into the outer felly 4, the outer ends of these pins projecting beyond the outer side of the metal band 16. A layer of gutta-percha or similar hard rubber 20 is vulcanized to the outer surface of the metal band 16 in such a way that the pins 19 are embedded in this gutta-percha layer and, preferably, the pins project some distance beyond the outer periphery of the gutta-percha strip or layer. The solid rubber tire 21 which is composed of a suitable rubber compound such, for example, as that commonly used upon ordinary solid ties, is then vulcanized to the outer surface of the strip or layer 20 of gutta-percha or hard rubber. This mode of mounting and securing the solid tire upon the outer felly insures a firm hold between the tire and the felly and it will prevent loosening and consequent breakage of the tire, the rubber compound of the tire being firmly united by vulcanization to the gutta-percha or hard rubber strip or layer and the gutta-percha layer being firmly secured to the metal band 16, and the pins 19 firmly secure the rubber tire to the gutta-percha or hard rubber layer and they firmly unite the tire and the gutta-percha layer to the felly.

The present invention provides a vehicle wheel which is capable of fulfilling the severe conditions imposed thereon when used upon automobiles and motor trucks, particularly when solid tires are used, the necessary amount of resilience being afforded by the inflated or pneumatic cushion to insure easy riding properties and to absorb shocks due to irregularities in the road surface, and while the resilience of the pneumatic cushion is obtained, yet the pneumatic cushion is not subject to puncture or wear. The present invention also provides an improved mode of mounting a solid tire upon the rim or outer felly of the wheel whereby loosening and consequent breakage of the tire, as commonly occurs with solid tires as heretofore applied, are avoided.

I claim as my invention:

1. In a vehicle wheel, the combination of a felly, a metal rim, dowel pins embedded and secured in the felly and extending through and projecting outwardly beyond said rim, a circumferential strip of hard rubber vulcanized to the outer periphery of the metal rim and to said dowel pins, and a tire vulcanized to the outer side of said hard rubber strip.

2. The combination of a metal rim, a plurality of metal pins fixed in the rim and projecting radially outwardly therefrom, a circumferential strip of hard rubber vulcanized to the pin-carrying rim, the pins projecting outwardly beyond the hard rubber, and a rubber tire vulcanized to the outer side of said hard rubber and having said projecting portions of the pins secured therein.

In testimony whereof I have hereunto set my hand in presence of two subscribing witnesses.

DANIEL MORIARTY.

Witnesses:
A. SILVEY,
FRANK E. POLK.

Copies of this patent may be obtained for five cents each, by addressing the "Commissioner of Patents, Washington, D. C."